April 13, 1954   P. M. OLMAN   2,674,852
EMERGENCY PRESSURE APPLICATOR
Filed Sept. 30, 1947   4 Sheets-Sheet 1

PETER MICHAEL OLMAN,
INVENTOR.

BY
ATTORNEY.

April 13, 1954

P. M. OLMAN

2,674,852

EMERGENCY PRESSURE APPLICATOR

Filed Sept. 30, 1947

PETER MICHAEL OLMAN,
INVENTOR.

BY
ATTORNEY.

April 13, 1954    P. M. OLMAN    2,674,852
EMERGENCY PRESSURE APPLICATOR
Filed Sept. 30, 1947    4 Sheets-Sheet 4

PETER MICHAEL OLMAN,
INVENTOR.

ATTORNEY.

Patented Apr. 13, 1954

2,674,852

UNITED STATES PATENT OFFICE 2,674,852

EMERGENCY PRESSURE APPLICATOR

Peter Michael Olman, Los Angeles, Calif.

Application September 30, 1947, Serial No. 776,933

5 Claims. (Cl. 60—54.5)

My invention relates generally to brake applying apparatus, and more particularly to apparatus of this type adapted to apply the brakes of a vehicle in the event of failure of the usual braking system. This application is a continuation-in-part of my prior application Serial No. 681,981, filed July 8, 1946, for Brake Applying Apparatus, now abandoned.

While the hydraulically and pneumatically operated brakes of modern vehicles are designed to give trouble-free service over an extended period of time, there is always the possibility that the tubing which carries the brake fluid from the master or operating cylinder to the servomechanism in the wheel may, because of fatigue or other mechanical injury, develop leaks or completely fail, thereby rendering the brakes inoperable. There is sometimes a warning period during which the brakes do not work properly but are not totally inoperative; but occasionally the brakes fail without any advance indication whatsoever. In either event, it generally happens that the failure occurs when the brakes are most vitally needed, since under these circumstances the pressure supplied by the master cylinder is the greatest, and the hydraulic tubing fails completely under this greater stress. As a result, many serious accidents are caused each year by the failure of the brakes to operate at the time when they are most urgently required. While separate, hand-operated mechanical brakes are provided on most automobiles, these brakes are normally used for holding the car when it is parked, and are frequently worn to the point when they are no longer able to stop the car when it is in motion.

In the design of an emergency braking system, the system should be operative whether the hydraulic tubing or the master cylinder itself has failed, and should supply a substantially equal force to each of the wheels so that there is no tendency of the vehicle to swerve when the brakes are applied. Furthermore, separate systems should be provided for each wheel so that in the event of a serious mechanical failure wherein the servo-mechanism of one wheel is damaged, brakes on the remaining wheels may still be applied. It is also important that the braking force applied be such as to stop the vehicle in the shortest possible time, while still being insufficient to turn the vehicle over, should the brakes be applied while traveling at a high speed.

It is therefore a major object of my invention to provide a brake applying apparatus which may be operated to apply the brakes of a vehicle when the normal system has failed.

Another object of my invention is to provide such an apparatus in which the force applied to each brake may be accurately controlled to balance the brakes and to insure that the vehicle will not be overturned when the brakes are applied.

It is a further object of my invention to provide an apparatus of this type which may be used, with few modifications, to operate hydraulic or pneumatically controlled brakes.

It is still another object of my invention to provide a device of this type which may be installed on existing vehicles with substantially no change in the braking system thereof, and with a minimum amount of installation work required.

These and other objects of my invention will become apparent from the following description of a preferred and a modified form thereof, and from the drawings illustrating those forms, in which.

Figure 1:
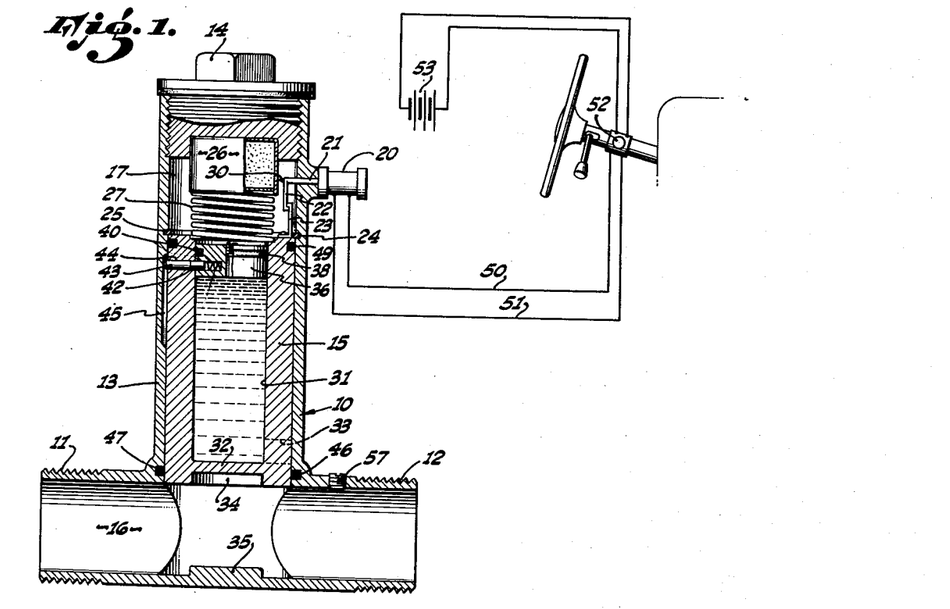
Fig. 1 is a vertical-sectional view of a first form of my device, adapted to operate hydraulic brakes, showing the parts in their normal or unoperated position, with a schematic wiring diagram indicating the method of controlling the device.

Referring now to the drawings and particularly to Fig. 1 thereof, the numeral 10 indicates a generally T-shaped housing having fluid connections 11 and 12 at opposite ends of the cross-bar of the T, and having a cylindrical stem portion 13 whose end is closed by a plug 14. My improved brake applying apparatus is designed to reduce the possibility of brake failure because of hydraulic line failure, and consequently, the housing 10 is adapted to be installed adjacent the wheel of the vehicle, with the fluid connection 12 inserted in the corresponding connection therein, in place of the usual hydraulic line which is then attached to the fluid connection 11. A cylinder 15, slidably mounted within the stem 13, is normally held out of a passageway 16 formed between the fluid connections 11 and 12, but may be moved toward the cross-bar of the T to close the passageway. When this is done, the parts are in the position shown in Fig. 2, and all fluid within the servo-mechanism is trapped therein, while fluid within the hydraulic line connected to the fluid connection 11 has no effect upon the action of the mechanism. Fluid within the cylinder 15 may then be forced out through the fluid connection 12, and the brakes will be applied thereby.

As seen in Fig. 1, the stem 13 is made sufficiently long to receive plug 14 and the entire length of cylinder 15, with a space 17 left between them. A solenoid 20 is mounted on the stem portion 13 aligned with the space 17, and a plunger 21 extends through the wall of the stem portion and into the space, being moved further inwardly by the solenoid when the latter is energized. Near its inner end, the plunger 21 is provided with a latch member 22 which is adapted to engage a co-operating latch member 23 attached to the upper end of the cylinder 15. A spring (not shown) is provided within the solenoid 20 to retain the plunger 21 in a normally retracted position, but its normal urging may be overcome by the energization of the solenoid to extend the plunger further into the space 17, thereby disengaging the latch members 22 and 23, and permitting the cylinder 15 to be moved downwardly into the passageway 16. To prevent the cylinder 15 from being moved upwardly into the space 17 beyond its normal position, a stop or retaining ring 24 is mounted in an internal circumferential groove 25 in the stem 13 to hold the cylinder against upward movement which might disengage the latching members 22 and 23.

Within the space 17, I mount a container 26 having a compressed gas therein, and a spring 27 bears against the container, or the plug 14 which holds it, and against the upper end of the cylinder 15 to urge the later downwardly. This downward movement, however, is normally resisted by the latch members 22 and 23; but when the solenoid 20 is energized, the latch members are separated and the cylinder is moved downwardly to the position shown in Fig. 2. To release the gas within container 26, the plunger 21 is provided with a point 30 at its innermost end which is adapted to bear against the container 26 and puncture the latter when the solenoid is energized. The compressed gas contained within the container 26 is thus released, at the same time that the cylinder 15 is released by the latching member 22 and is moved downwardly by the spring 27.

Within the cylinder 15 is an axial cavity 31 which is open at its upper end to the space 17, and is closed at its lower end by a horizontal partition 32 and passageways 33 are formed in the lower portion of the wall of the cylinder to connect the cavity with the fluid coupling 12 when the cylinder is in its lowered position. The lower surface of the partition 32 is provided with a recess 34 which is adapted to engage a corresponding boss 35 on the lower surface of passageway 16 to prevent any transverse movement of the cylinder 15 when the latter is in its lowered position.

Slidably mounted within the cavity 31 is a piston 36 which is normally held at the upper end of cylinder 15 but which may be moved downwardly to force any fluid within the cavity out through passageways 33. The piston 36 is preferably formed with a circumferential groove 37 in which a sealing ring 38 is mounted so that none of the fluid may pass around the piston instead of being discharged through passageways 33. It is to be noted that in this form of my device, spring 27 bears against the upper edge of cylinder 15 and not against the upper surface of piston 36.

Figure 2:
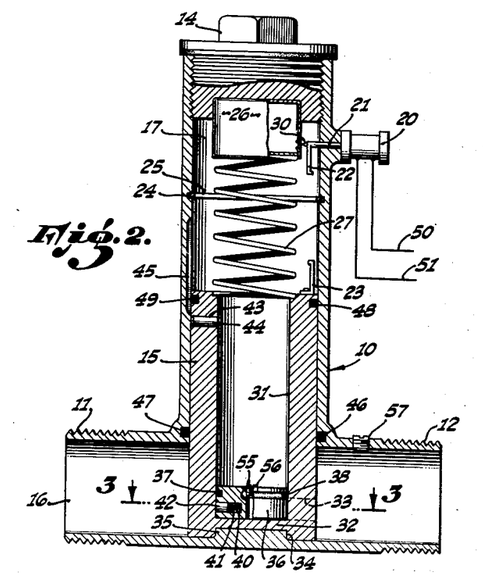
Fig. 2 is a vertical-sectional view similar to Fig. 1 with the parts in the positions they occupy when the device is operated to apply the brakes.

When the container 26 is punctured, the compressed gas container therein will act on the upper surface of the piston 36 and urge it downwardly. However, until such time as the cylinder 15 has been seated against the lower surface of passageway 16, it is undesirable to have the fluid within the chamber 31 forced outwardly through the passageways 33. To retain the piston 36 in its upper position until this has occurred, I provide a locking means somewhat similar to the pin and tumbler arrangement used in certain locks. As shown in Fig. 1, this locking means includes a hole 40 formed in the piston 36, having a spring 41 therein which is adapted to urge a pin 42 outwardly. A hole 43 is formed in the cylinder 15 to align with the hole 40 when the piston 36 is in its uppermost position; and a pin 44, substantially the same diameter as pin 42, is mounted in hole 43 and extends outwardly from the cylinder, to fit into a longitudinally extending slot 45 formed in the inside surface of the stem portion 13. With the various parts of the brake actuator in their normal position, as shown in Fig. 1, spring 41 urges pin 42 outwardly to fit into the hole 43 and thereby prevent downward movement of the piston 36 with respect to the cylinder 15. When the cylinder is moved downwardly, however, as shown in Fig. 2, the pin 44 reaches the end of slot 45 and is forced inwardly, thereby moving the pin 42 inwardly until it is flush with the surface of the piston 36. At that instant, the piston 36 is released from cylinder 15 and the pressure of the gas which has been released from container 26 urges the piston downwardly, thus forcing any fluid contained within the cavity 31 out through the passageways 33. As shown in the drawings, I prefer to use a pair of pin locks located diametrically opposite each other to prevent the piston 36 from being tipped at an angle and thus jamming within the cylinder 15.

To complete the device, I provide a pair of sealing members to prevent the escape of pressure from the space 17, around the cylinder 15, and to the fluid connection 11. At the lower end of the stem 13, I form a circumferential groove 46 adapted to receive a sealing ring 47 which bears against the cylinder 15; and the upper end of the cylinder is provided with a circumferential groove 48 which carries a sealing ring 49 bearing against the inner surface of the stem 13. In this way, the cylinder 15 may be made to slide freely within the stem 13 while a fluidtight seal is maintained between the space 17 and the fluid connections 11 and 12 at all times.

To operate the solenoid 20, a pair of conductors 50 and 51 are connected through a switch 52, preferably of the double pole, single throw variety, to a source of electrical energy 53. The source 53 may be customary storage battery found in most vehicles, or may be a generator or any other suitable source of power. The switch 52 may be mounted on the steering column of the vehicle, on the instrument panel, or at any other suitable place. It should be readily accessible, however, so that in the event of an emergency, it may be operated instantly to close the circuit to the solenoid 20.

Since the cylinder 15 must have its cavity 31 filled with fluid in order for the device to operate, I provide a filler hole 55 in the piston 36 which is closed by a threaded plug 56 except when the cavity is being filled with fluid, or air is being removed therefrom. Similarly, I provide a removable plug 57 in the fluid connection 12 to permit the brakes of the vehicle to be released without the necessity of removing the entire housing 10.

Figure 3:
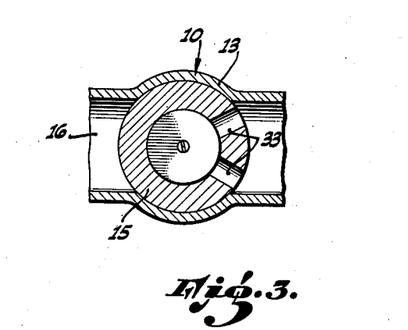
Fig. 3 is a transverse cross-sectional view taken at 3—3 in Fig. 2.

Operation of Figs. 1 to 3

When my improved emergency brake applicator has been installed on a vehicle, it will normally be installed so that the fluid connection 12 is fitted into the coupling member mounted on the axle of the vehicle, and the fluid connection 11 will have the usual hydraulic line from the master cylinder of the braking system connnected to it. The cavity 31 is filled with a suitable hydraulic fluid; the piston 36 is held in its uppermost position by the pins 42 and 43; and cylinder 15 is raised to bear against the retaining ring 25 and is held there by the latch members 22 and 23. Container 26 is filled with a compressed gas, preferably carbon dioxide or some other inert gas, and spring 27 is compressed to urge the cylinder 15 downwardly. Passageway 16 thus provides an unrestricted fluid connnection between couplings 11 and 12, and the brakes of the vehicle may be operated in their normal manner and with the usual results until some emergency arises, at which time switch 52 is closed.

When switch 52 is closed, solenoid 20 is energized and plunger 21 thereof is moved inwardly to release latching members 22 and 23 and to puncture container 26. As soon as latching member 23 is released, cylinder 15 is moved downwardly by the action of spring 27, while the puncturing of the container 26 releases the gas contained therein so that the pressure in space 17 is greatly increased. When cylinder 15 reaches the lower limit of its travel and "bottoms" against the lower surface of passageway 16, pins 44 are moved inwardly by reason of their reaching the lower ends of slots 45. The inward movement of pins 44 causes the pins 42 to be moved inwardly against the urging of spring 41, and when the abutting surfaces of pins 42 and 44 are aligned with the inner surface of cylinder 15, piston 36 is released from its uppermost position, and is moved downwardly to the lower end of the cylinder by the pressure in space 17. The brake fluid contained within the cavity 31 is thereby forced outwardly through the passageways 33 and through the fluid coupling 12 to the servo-mechanism of the brakes to operate the latter, the quantity of fluid within the cavity being sufficient to "charge" the servo-mechanism, while the pressure in space 17 is sufficient to supply the continuing pressure necessary for the operation of the brakes. By properly correlating the amount of compressed gas within container 26, with the volume of space 17 and the volume of cavity 31, the braking force exerted on the wheels may be adjusted to lock the wheels at a predetermined speed, but this same force will be insufficient to lock the wheels at any greater speed. In this way, the braking force applied to the wheels of a vehicle traveling at a relatively high speed will be sufficient to slow the vehicle very rapidly, but will be insufficient to turn the vehicle over. When the speed of the vehicle has been reduced to the value at which the wheels will lock, the principal danger of overturning the vehicle has been eliminated and the brakes will then lock and complete the task of stopping the vehicle. The brakes will remain in this locked condition until the pressure in the servo-mechanism is released either by removing the plug 57 from the coupling 12, or by removing the plug 14 and permitting the gas in the space 17 to escape.

Figure 4:
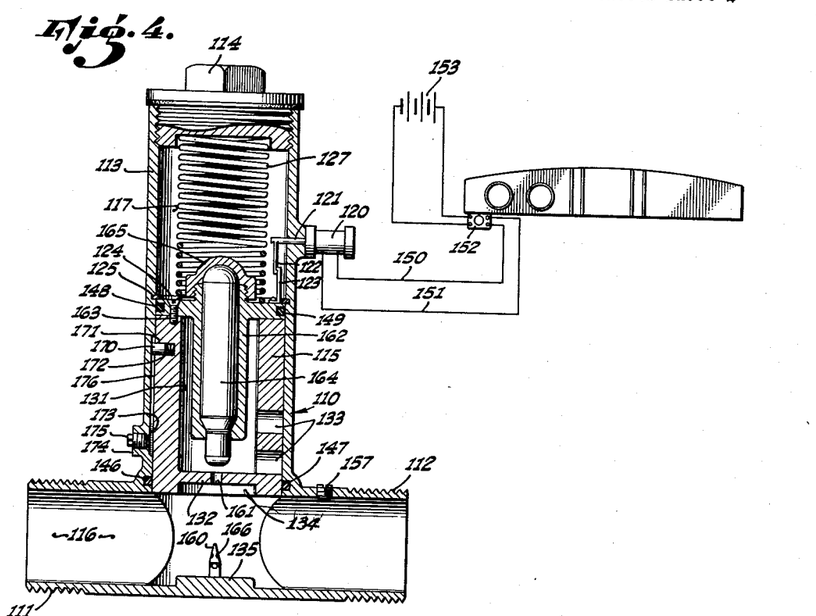
Fig. 4 is a vertical-sectional view of a modified form of my device adapted to be used in brake systems which are operated by pneumatic means, and showing a slightly modified control.
Figure 5:
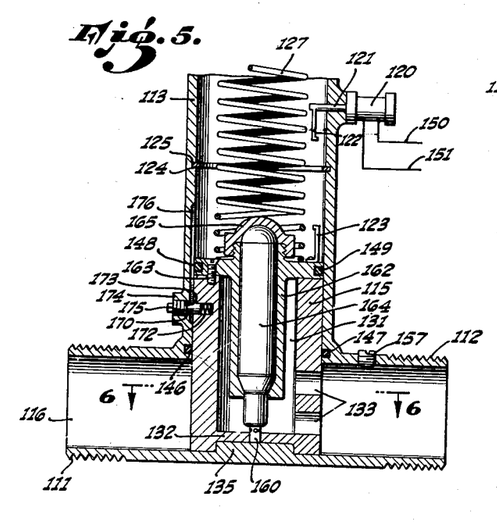
Fig. 5 is a vertical-sectional view similar to Fig. 4, the parts being in the positions they occupy when the brakes have been actuated.
Figure 6:
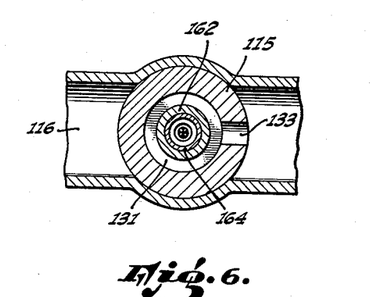
Fig. 6 is a cross-sectional view taken at 6—6 in Fig. 5.

Description of Figs. 4 to 6

In Figs. 4 to 6, I have shown a modification of my device which may be used to operate pneumatically controlled brakes of vehicles when the normal operating force consists of a positive pressure instead of a suction or partial vacuum. In the drawing, parts corresponding to similar members in Figs. 1 to 3 are indicated by corresponding numbers 100 units larger. Thus a body member 110 has a master cylinder hydraulic connection 111 and a servo-mechanism hydraulic connection 112 joined by a fluid passageway 116 from which a perpendicular stem portion 113 extends, while a release plug 157 permits the release of the brakes after they have been applied. A piston 115, similar to piston 15, is slidably mounted in the stem portion 113; and a solenoid 120 has a plunger 121 which extends into a space 117 above the piston 115, and carries a latching member 122 which engages with a second latching member 123 attached to the upper portion of the cylinder. A stop, such as a retaining ring 124 mounted in a groove 125, limits the upward travel of the cylinder 115, while a plug 114 is fitted in the upper end of stem portion 113 so that a spring 127 may bear against it and the upper surface of the cylinder to urge the latter downwardly.

The lower end of the stem 113 is provided with a circumferential groove 146 which receives a sealing ring 147 bearing against the piston 115; and the upper end of the latter is provided with a similar groove 148 adapted to receive a sealing ring 149 which bears against the interior surface of the stem 113. The lower end of the cylinder 115 is closed by a partition 132, while passageway 133 is formed in the side of the piston adjacent the fluid connection 112. The lower surface of the passageway 116 is provided with a boss 135 adapted to fit into a recess 134 in partition 132; and a pointed projection 160 is centrally located on the boss to extend through a hole 161 in the partition 132 when the cylinder is in its lowest position. Conductors 150 and 151 connect the solenoid 120 through switch 152 to battery 153; and all the parts so far mentioned, with the exception of projection 160 and hole 161, are similar to the similarly numbered parts of the form shown in Figs. 1 to 3.

At the upper end of cylinder 115, I provide a receiving member 162 which is held to the top of the cylinder by screws 163 or other suitable means, and which extends downwardly into the interior of the cylinder and receives a container 164 holding a compressed gas. The container 164 may be of the type used to carbonate water and other beverages in siphon bottles, and generally provided with an easily punctured closure formed in the neck of the container. The receiving member 162 is adapted to receive the container 164 with the neck pointing downwardly where it may be contacted by the projection 160; and a cap 165 is screwed to the upper portion of the receiving member to hold the container therein against longitudinal movement. It will thus be seen that when the cylinder 115 is moved downwardly, as shown in Fig. 5, the projection 160 will extend through the hole 161 and puncture the seal in the neck of the container 164, while holes 166 or grooves permit the compressed gas to escape from the container 164 to fill the cavity 131 in the cylinder 115.

Any pressure within the cavity 131 will act upon the upper wall thereof and on the boss 135 to tend to raise the cylinder 115 and permit the increased pressure therein to escape through the hole 161. To prevent this, I provide a catch means which is adapted to hold the piston 115 in its lowermost position until intentionally and manually released. While other forms of catches may be used, I prefer to use a pin 170 which is mounted in a radially drilled hole 171 in the piston 115, and which is urged outwardly at all times by a spring 172 which bears against the inner end of the hole and against the pin. Near the lower end of stem 113, I provide a hole 173 the same diameter as hole 171 and adapted to be aligned with the latter when the cylinder 115 is in its lowermost position. A boss 174 surrounds the hole 173 on the outside of the stem 113, and a plug 175 is screwed into hole 173 so that the latter is normally covered but may be opened. A longitudinal groove 176 extends upwardly from hole 173 in the wall of the stem 113 to receive the pin 170 and act as an aligning means to prevent the rotation of the cylinder 115. When the cylinder 115 has been released and moved to its lowermost position by spring 127, pin 170 is moved outwardly by spring 172, entering the hole 173 and locking the cylinder against upward movement until the plug 175 is removed and the pin forced inwardly.

Operation of Figs. 4 to 6

The various parts of the device are normally in the position shown in Fig. 4, with the seal in the neck of the container 164 unbroken. However, when it is desired to operate the pneumatic brake of a vehicle by means of my improved emergency brake applicator, switch 152 is closed, completing the circuit from battery 153 to solenoid 120. When solenoid 120 is energized, plunger 121 is moved inwardly, thereby disengaging the latching members 122 and 123 and permitting the cylinder 115 to be moved downwardly under the urging of spring 127. As cylinder 115 reaches the downward limit of its travel, projection 160 passes through hole 161 to bear against and finally puncture the seal in the neck of container 164, permitting the compressed gas therein to escape into cavity 131 and then outwardly through passageway 133. At the same time this is occurring, pin 170 is being aligned with hole 173, whereupon the pin is moved outwardly by spring 172 to the position shown in Fig. 5, where it locks the cylinder 115 against upward movement. The compressed gas originally within the container 164 is thus conducted through fluid connection 112 to the servo-mechanism of the brakes, operating the latter and bringing the vehicle to a stop.

By properly correlating the amount and pressure of the gas within container 164, with the volume and pressure requirements of the servo-mechanism of the brakes, the braking force exerted by the latter may be adjusted so that the vehicle will not be overturned if traveling at a very high speed, but instead will be slowed until such time as it is safe for the wheels to be locked. The operation of this form of my device is thus seen to be quite similar to that of my preferred form with the exception that a compressed gas instead of a liquid under pressure is used to operate the servo-mechanism of the brakes. As in the form shown in Figs. 1 to 3, when the brakes of a vehicle have been operated by means of this emergency brake applying device, they will remain in operated condition until the pressure is released by removing the plug 157 from the fluid coupling 112, or by removing plugs 114 and 175 and releasing pin 170 from hole 173.

Description of Figs. 7 to 10

In both of the previously described forms, a compressed gas, normally held in a sealed container, is released by puncturing that container to operate the brakes of a vehicle. As a result, when the brakes have once been operated by these devices, it is necessary to replace the container holding the compressed gas in addition to returning the piston to its normal position. Where it is anticipated that the need or desirability of replacing the container after each operation will be very slight, the form of device shown in Figs. 7 to 10 may be used to operate hydraulic brakes. It will be seen that many of the parts of the device shown in Figs. 7 to 10 are similar to those in the device shown in Figs. 1 to 3, and similar parts of the optional form have been given reference numerals in the two hundred series to correspond to similar parts of the first form.

Thus, this optional form of my device includes a T-shaped housing 210, corresponding to the housing 10 of the preferred form, having fluid couplings 211 and 212 at the ends of the cross-bar of the T and having a stem portion 213 closed by a plug 214. Slidably mounted in the stem 213 is a cylinder 215 which is normally held in an upper position, shown in Fig. 7, but which may be lowered to close a fluid passageway 216 extending between fluid couplings 211 and 212. A space or cavity 217 is formed between the upper surface of the cylinder 215 and the plug 214; and a solenoid 220 is attached to the stem 213 so that its plunger 221 extends into the space where it carries a latching member 222 adapted to engage a latching member 223 attached to the upper surface of the piston 215. To limit the upward travel of the cylinder 215, a stop such as a ring 224 is mounted in a groove 225 formed in the interior surface of the stem 213. The cylinder 215 is formed with a coaxial central cavity 231 which receives a piston 236; and a spring 227 extends between the cap 214 and the piston to urge the latter downwardly.

Figure 7:
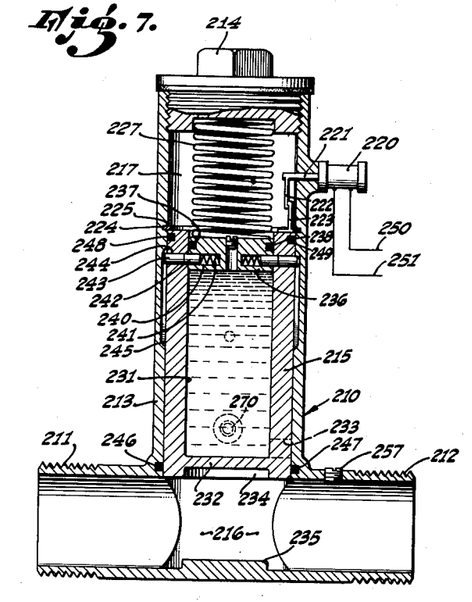
Fig. 7 is a vertical-sectional view of a third form of my device adapted to be used in hydraulically controlled brake systems, showing the parts in their normal positions.

The lower end of cylinder 215 is closed by a partition 232 having a recess 234 therein adapted to engage a boss 235 formed in the lower surface of the passageway 216 when the cylinder is in its lowermost position. Passageways 233 are formed in the lower end of cylinder 215 on the side nearest the fluid coupling 212, and as in the other form, fluid within the cavity 231 may be forced outwardly through the passageways 233 when the piston 236 is moved downwardly. A groove 246 is formed in the stem portion 213 at the lower end thereof to receive a sealing ring 247 which bears against the cylinder 215 to prevent the passage of fluid between the piston and the stem portion. A similar sealing means, including a groove 248 containing a sealing ring 249 is formed in the upper portion of cylinder 215 so that both the upper and lower ends of the cylinder are sealed at all times. Similarly, a groove 237 is formed in piston 236 to receive a sealing ring 238 which bears against the inner surface of cylinder 215 to prevent the passage of fluid from cavity 231 into space 217. A filler hole 255, closed by a threaded plug 256, permits the filling of cavity 231 with fluid and the bleeding of air therefrom; and a release plug 257 is provided in fluid connection 212 to permit the release of pressure from the servo system after the vehicle has been stopped.

The normal position of piston 236 is at the upper end of cylinder 215, and it is held in this position by a pin 242 slidably mounted in a hole 240 and urged outwardly by a spring 241 which bears against the inner end of the hole and the inner end of the pin. A hole 243 is formed in the cylinder 215 to align with hole 240 when the piston 236 is in its uppermost position, and a pin 244 is inserted in hole 243 to bear against the outer end of pin 242 and extend outwardly from the cylinder when pin 242 extends into hole 243. To receive the outer end of pin 244, a longitudinally extending groove 245 is formed in the inner surface of stem 213, terminating at a point just above the position of the pin 244 when the cylinder 215 is in its lowermost position. Two of the pin and groove catches are provided for the piston 236, and as previously mentioned, they operate to hold the piston in its uppermost position until such time as the cylinder 215 has been moved downwardly to its lowermost position, at which time the pins 244 are forced inwardly to align the outer ends of pins 242 with the piston 236, whereupon the latter is released and may be moved downwardly. Connectors 250 and 251 connect the solenoid through a suitable switch to a source of power in a manner similar to that described in connection with the previously described forms of my device.

To hold the cylinder 215 in its lowermost position when it has been moved there by springs 227, a catch, similar to that shown in Figs. 4 and 5 is provided. As shown best in Fig. 9, cylinder 215 is provided with an outwardly extending radial hole 271 adapted to receive a pin 270 and a spring 272. A similar hole 273, aligned with hole 271 when the cylinder 215 is in its lowermost position, is formed in stem 213 which is provided with a boss 274 surrounding the hole 273 at its outer end. A plug 275 is screwed into hole 273 and a spring operated catch similar to that shown in connection with my pneumatic control form is thus provided. However, since grooves 245 receive pins 244 and prevent the rotation of cylinder 215 about its axis, no groove is required for pin 270 and the latter may ride upon the inner surface of stem 213.

Operation of Figs. 7 to 10

Figure 8:
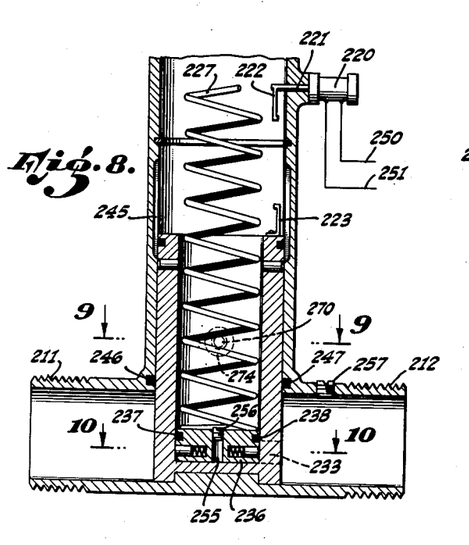
Fig. 8 is a vertical-sectional view similar to Fig. 7 showing the parts in their operated positions.
Figure 9:
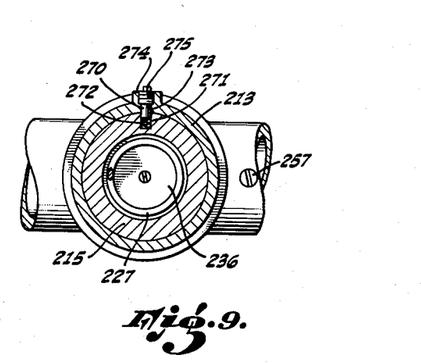
Fig. 9 is a cross-sectional view taken at 9—9 in Fig. 8, showing the catch arrangement adapted to hold the parts in their operated position.
Figure 10:
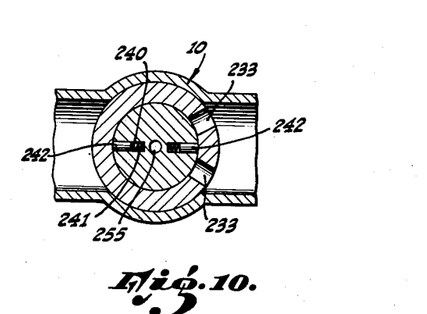
Fig. 10 is a cross-sectional view taken at 10—10 in Fig. 8.

When the solenoid 220 of this optional form of emergency brake applying device is energized by the closing of the switch, the plunger 221 is moved inwardly into the space 217 and the latch member 222 is disengaged from latch member 223. Piston 236 is held to cylinder 215 by the pins 242, and the downward urging of spring 227 is thus transmitted to the cylinder which is now free to move downwardly. When the cylinder 215 has reached its lowermost position, as shown in Fig. 8, the fluid connection previously existing between fluid couplings 211 and 212 has been closed and cavity 231 is now open, through passageways 233, to the servo-mechanism of the brakes which is connected to fluid coupling 212. When the piston 215 reaches its lowermost position, pin 270 is moved into hole 273 of the stem member 213 by spring 272, thereby holding the cylinder in its lowered position and preventing any pressure within the fluid coupling 212 from raising the cylinder and reopening the fluid passageway 216. At the same time that pin 270 snaps into hole 273, the downward movement of the cylinder has brought pins 244 to the end of grooves 245, where the former are forced inwardly to align the outer ends of pins 242 with the inner surface of the cylinder so that that piston 236 is then released from its normal position.

The entire force of spring 227 is then directed solely against piston 236, and the latter is therefore moved downwardly, forcing any hydraulic fluid within chamber 231 outwardly through passageways 233 to operate the servo-mechanism of the brakes connected to fluid coupling 212. The brakes of the vehicle are thus operated; and the force exerted by spring 227 is correlated with the servo-mechanism so that the braking force exerted by the wheels of the vehicle is insufficient to overturn the latter should it be traveling at a relatively high speed when the brakes are applied. At some lower speed, this force may be sufficient to lock the wheels of the vehicle, but this speed is sufficiently low so that there is no danger of overturning the vehicle.

Once the brakes have been applied by means of this device, they will remain energized until the pressure within the servo-mechanism is reduced by removing plug 257 from the fluid coupling 212, or by raising cylinder 215 or piston 236. To return the cylinder 215 and piston 236 to their normal positions, plug 214 is removed to relieve the pressure exerted by spring 227, and plug 275 is removed to permit pin 270 to be forced inwardly so that it no longer holds the cylinder in its lowermost position. The latter may then be raised to its normal position and latch members 222 and 223 engaged to hold it in that position; and piston 236 may be raised to its normal position, whereupon pins 242 will be urged outwardly to enter holes 243 where they will hold the piston against downward movement. Spring 227 is then compressed and plug 214 reinstalled, and if the cavity 231 is filled with hydraulic fluid, the device is again ready for operation. If the chamber 231 is made sufficiently large, and if the spring 227 exerts a sufficient force on the piston 236, this device may be used to operate the brakes of a vehicle having a pneumatically controlled system, though generally better results will be obtained by using the form of device shown in Figs. 4 to 6 in such application.

Figure 11:
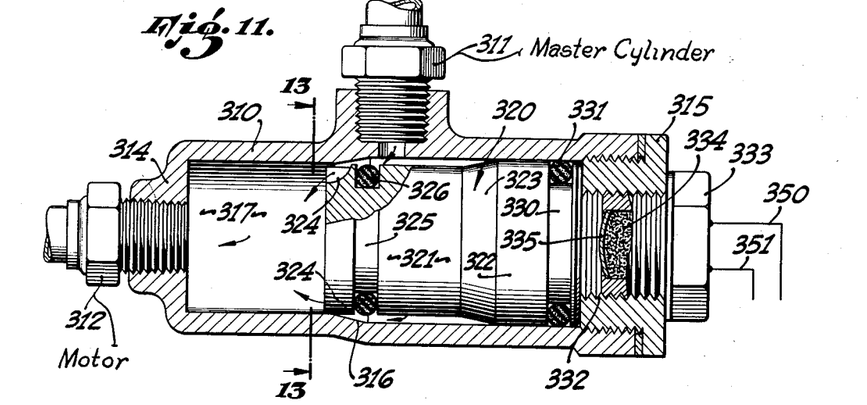
Fig. 11 is a vertical cross-sectional view of a preferred form of my invention, adapted to be used in the operation of hydraulic brakes, and shown in its normal condition.
Figures 12, 13:
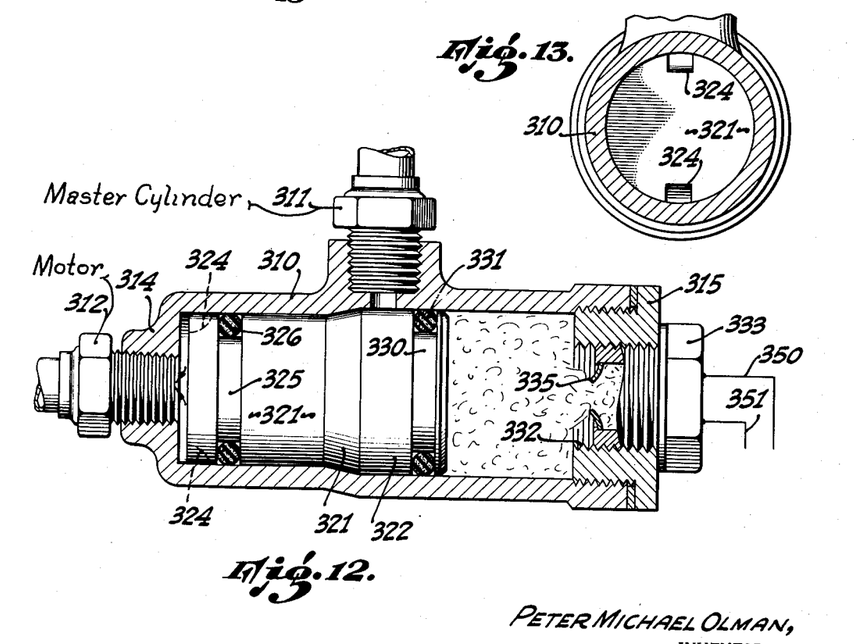
Fig. 12 is a view similar to Fig. 11 but showing the members in their actuated positions.
Fig. 13 is a cross-sectional view taken at 13—13 in Fig. 11 and showing the face of the piston.

Description of Figs. 11 to 13

The preferred form of my apparatus is shown in Figs. 11 to 13 and includes generally the same broad features of construction and arrangement of parts as those of the forms previously described, with certain improvements and modifications which simplify the manufacture and better the operation of the device.

As shown in these views, the preferred form of my device includes a generally cylindrical housing 310 having a fluid connector 312 at one end thereof, adapted to be connected to the servo-mechanism of the brakes (not shown). On the side of the housing 310 and near the middle thereof I provide another fluid connector 311, similar to the fluid connector 312, and adapted to be connected in any suitable manner to the master cylinder (not shown) of the braking system. The interior of the housing 310 is hollowed to form a central chamber 317, and a fluid connection is thus established from the connector 311, through the chamber 317, to the connector 312.

The end of the housing 310 in which the connector 312 is mounted is closed by a wall 314, while the opposite end of the housing is closed by a threaded plug 315, which is tightly and firmly held therein. As previously indicated, the housing 310 is provided with a chamber 317, and it will be noted that the diameter of the chamber is larger at the end nearer the plug 315, and smaller at the end adjacent the wall 314. Between the two sections of different diameter, I provide a tapering or conical shoulder section 316 which is located between the wall 314 and the connection 311, immediately adjacent the latter.

Slidably mounted in the central chamber 317 is a piston 320 normally adapted to remain adjacent the plug 315 but capable of being moved away from the latter toward the wall 314. To insure the proper operation of the device, I form the piston 320 so that it fits snugly within both the larger and smaller diameter sections of the chamber 317, and consequently the piston is stepped to provide a section 321 of smaller diameter and a section 322 of larger diameter, these two sections being joined by a tapered portion 323 shaped complementally to the shoulder 316. When the piston 320 is in its normal position, a compartment is thus formed between the smaller face of the piston and the wall 314, and an annular space or cavity is formed between the smaller section 321 and the inner wall of the housing 310, extending from the shoulder 316 to the tapered section 323. It is to this annular space that the connector 311 is directly fluid connected.

To establish a fluid connection between the end compartment of the chamber 317 and the annular space or cavity just mentioned the end of the section 321 is provided with one or more slots 324 which extend inwardly through the body of the section to a point adjacent the shoulder 316. In this way, fluid may flow from the annular space into the larger compartment as indicated by the arrows in Fig. 11, thereby providing a fluid connection between the connectors 311 and 312.

Between the end of the groove 324 and the tapered portion 323, I provide an annular groove 325 adapted to receive a sealing member 326, such as a so-called O-ring. The outer diameter of the sealing member 326 is such that it is spaced from the shoulder 316 in its normal position, but is adapted to make a sealing fit with the walls of the housing 310 when the piston 320 is moved toward the wall 314. A similar sealing means is provided in the piston 320 near its opposite or larger end, this means including a groove 330 adapted to receive a sealing member 331 such as an O-ring similar to that previously described.

To complete the preferred form of my device, I locate a small explosive charge within the plug 315 so that the charge may be detonated and thereby force the piston 320 toward the wall 314. One method of accomplishing this is to provide the plug 315 with an axially extending threaded hole 332 into which a correspondingly threaded plug or cap 333 may be placed. The inner end of the plug or cap 333 is hollowed to receive an explosive charge 334, such as a small amount of black powder, the charge preferably being held in place by a thin moisture-proof membrane 335. Embedded within the explosive charge 334 is a detonator (not shown) adapted to be operated by an electric current, and wires 350 and 351 lead from the detonator to a suitable electrical controlling means such as that previously described in connection with the other forms of my invention and illustrated in Figs. 1 and 4.

Operation of Figs. 11 to 13

Under normal conditions, the various elements of my preferred form of emergency brake applying apparatus will be disposed within the housing 310 in the positions indicated in Fig. 11. When such is the case, fluid from the master cylinder of the braking system will flow through the connector 311 into the annular space surrounding the smaller section 321 of the piston 320. From this annular space, fluid will pass through the grooves 324 into the larger compartment between the end of the smaller section 321 and the wall 314, leaving the compartment through the connector 312 and going to the servo-mechanism of the brake. Any tendency of acceleration or vibration to move the piston 320 away from the plug 315 and toward the wall 314 is overcome by the fluid within the compartment 314 and the end of the piston 320, the fluid therein acting substantially as a non-elastic mass. Furthermore, any pressure which may be applied through the connector 311 increases the pressure within the annular space surrounding the smaller section 321, this force being transmitted to the tapered section 323 to urge the latter and the piston 320 toward the plug 315.

When the pressure from the master cylinder is released, the pressure within the servo-mechanism reverses the flow of fluid so that it is now from the connector 312, through the slots 324, and out through the connector 311. It will be apparent that this action likewise tends to force the piston 320 toward the plug 315. Consequently, under normal circumstances the brakes of the vehicle equipped with my improved apparatus operate in the usual manner with no substantial restriction interposed between the master cylinder and the servo-mechanism of the brakes.

However, when an emergency arises and the normal operation of the master cylinder is not effective to stop the vehicle, a switch such as the switch 152 previously described is closed to complete an electrical circuit to the conductors 350 and 351, thereby exploding the charge 334 and rupturing the membrane 335. When this occurs, the piston 320 is driven away from the plug 315 toward the wall 314 with considerable force, the motion of the piston being stopped by the tapered section 323 hitting and bearing against the shoulder 316. At this time, the various members of my device are in the position indicated in Fig. 12.

It will be realized that the movement of the piston 320 to the position indicated in Fig. 12 has acted to prevent the escape of fluid through the slots 324 by moving the latter away from the annular space or cavity adjacent the connector 311.

Shortly thereafter, the sealing member 326 has contacted the inner walls of the housing 310 to form a fluid-tight seal, and further movement of the piston 320 has forced all or substantially all of the fluid in the compartment between the wall 314 and the end of the piston 320 through the connector 312. As a result, the fluid connector 311 has been effectively disconnected from the servo-mechanism of the brakes, and the hydraulic fluid within the housing 310 has been forced into that mechanism, thereby setting the brakes and bringing the vehicle to an immediate stop. The gas created by the explosion of the charge 334 remains within the housing to maintain the pressure of the hydraulic fluid within the servo-mechanism and the brakes may be released only by loosening or removing the plug or cap 333 so that these gases may escape. When this is done, the pressure of the fluid within the servo-mechanism will move the piston 320 toward the plug 315 until it reaches its original position shown in Fig. 11. Consequently, no air will be admitted to the hydraulic system by reason of the operation of my device, and maintenance costs and procedures will thus be reduced to a minimum. Disregarding any repairs or maintenance work on the braking system itself, after the operation of my device it is only necessary to replace the plugs or caps 333 in order to return the complete braking system to its original condition. The plugs or caps 333, being very simple to manufacture and formed of relatively inexpensive materials, may be replaced at a very nominal cost so that the benefits to be gained from the use of my device are tremendous.

With a few simple changes, it is possible to modify my preferred form of device to operate pneumatically controlled brakes of the positive pressure type. To accomplish this, the piston 320 may be hollowed and provided with a container holding a compressed gas, such as the container 164 shown in Figs. 4 and 5. The adjacent wall 314 will then be provided with a projection adapted to puncture the seal of the container 164 and permit the gas contained therein to escape, similar to the form shown in Figs. 4 and 5 and previously described.

To insure that the piston 320 will remain adjacent the end wall 314 when the device is used in the pneumatic system, the charge 334 may be proportioned so that after it is exploded, the pressure between the plug 315 and the larger end of the piston 320 is greater than the pressure between the wall 314 and the smaller end of the piston. As an alternative means, a sliding pin type of detent may be used, such as the pin 170 sliding within the groove 173 of the form shown in Figs. 4 and 5.

By changing the solenoid 20, 120, or 220 of the forms shown in Figs. 1 to 10 so that the plunger 21, 121, or 221 is moved inwardly to release the latching member when the solenoid is de-energized instead of when the solenoid is energized, the device may be used to set the brakes of towed vehicles, such as trailers, should the latter break loose from the vehicle which is pulling them. Should such a system be used, the operating switch would then, of course, be a normally closed switch which would maintain the solenoid energized at all times until the circuit is broken, either by the switch or by the separation of the wires in the circuit. While a slight modification would be necessary to adapt the preferred form of my device, shown in Figs. 11 to 13, to this type of operation, it is believed these changes will be apparent to those skilled in the art.

While I have shown and described preferred and optional forms of my device, it is apparent that modifications may be made therein which do not depart from the scope of the invention; and I do not wish to be limited to the particular form or arrangement of parts herein described and shown, except as covered by my claims.

I claim:

1. An emergency brake applicator which includes: a housing having a chamber therein, said chamber having a portion of larger diameter at one end and a portion of smaller diameter at the other, said portions of larger and smaller diameter being substantially cylindrical and joined by a tapered portion which is short compared to said cylindrical portions; a piston slidably mounted in said chamber, having a smaller section adapted to fit within said smaller portion of said chamber, a larger section adapted to fit within said larger portion of said chamber, and a tapered section joining said larger and smaller sections shaped complementally to said tapered portion of said chamber, said piston normally being retained near the larger end of said chamber to form a compartment bounded by the walls and smaller end of said chamber and the end of said smaller section of said piston, and forming an annular space between the walls of said chamber forming said tapered portion and said larger portion, and the smaller section and tapered section of said piston; a first fluid connector attached to said housing, adapted to be connected to a fluid controller, and making fluid connection to said annular space; a second fluid connector attached to said housing, adapted to be connected to a fluid operating means, and making fluid connection to the end of said compartment remote from said piston, said piston having passageways formed in the end of the smaller section thereof to provide a fluid connection between said compartment and said annular space when said piston is in its normal position; and electrically detonated explosive means mounted in said housing at the larger end of said chamber, operable to drive said piston toward said second connector, whereby said fluid connection between said compartment and said annular space is first closed, and fluid within said compartment is then compressed and discharged through said second connector.

2. An emergency pressure applicator which includes: a housing having a chamber therein, said chamber having a portion of larger diameter at one end and a portion of smaller diameter at the other, said portions of larger and smaller diameter being substantially cylindrical and joined by a tapered portion therebetween; a piston slidably mounted in said chamber, having a smaller section adapted to fit within said smaller portion of said chamber, a larger section adapted to fit within said larger portion of said chamber, and a tapered section joining said larger and smaller sections shaped complementarily to said tapered portion of said chamber, said piston being normally retained near the larger end of said chamber to form a compartment bounded by the walls and smaller end of said chamber and the end of said smaller section of said piston, and forming an annular space between the walls of said chamber forming said tapered portion and said larger portion, and the smaller section and tapered section of said piston; a first fluid connector attached to said housing, adapted to be connected to a fluid controller, and making fluid connection to said annular space; a second fluid connector attached to said housing, adapted to be connected to a fluid-operating means, and make fluid connection to the end of said compartment remote from said piston, said piston having a passageway formed in the end of said smaller section thereof to provide a fluid connection between said compartment and said annular space when said piston is in its normal position; and means connected to said housing at the larger end of said chamber, and operable to drive said piston toward said second connector, whereby said fluid connection between said compartment and said annular space is first closed, and fluid within said compartment is then compressed and discharged through said second connector.

3. An emergency pressure applicator which includes: a housing having a chamber therein, said chamber having a portion of larger diameter at one end and a portion of smaller diameter being substantially cylindrical and joined by a tapered portion therebetween; a piston slidably mounted in said chamber, having a smaller section adapted to fit within said smaller portion of said chamber, a larger section adapted to fit within said larger portion of said chamber, and a tapered section joining said larger and smaller sections shaped complementarily to said tapered portion of said chamber, said piston being normally retained near the larger end of said chamber to form a compartment bounded by the walls and smaller end of said chamber and the end of said smaller section of said piston, and forming an annular space between the walls of said chamber forming said tapered portion and said larger portion, and the smaller section and tapered section of said piston; a first fluid connector attached to said housing, adapted to be connected to a fluid controller, and making fluid connection to said annular space; a second fluid connector attached to said housing, adapted to be connected to a fluid-operating means, and make fluid connection to the end of said compartment remote from said piston, said piston having a passageway formed in the end of said smaller section thereof to provide a fluid connection between said compartment and said annular space when said piston is in its normal position, and said piston having an annular groove in said smaller section inward of said passageway; an O-ring in said annular groove in said smaller section, said O-ring being capable of making a sealing fit with the wall of said smaller chamber portion when said piston is moved from its normal position toward said second connector; and means connected to said housing at the larger end of said chamber, and operable to drive said piston toward said second connector, whereby said fluid connection between said compartment and said annular space is first closed, and fluid within said compartment is then compressed and discharged through said second connector.

4. A device of the class described which includes: a housing having a generally cylindrical chamber therein, said chamber having a large bore and a small bore with the axes of said bores being parallel, said housing having an intake port opening into said large bore and an outlet port opening into said small bore; tapered shoulder means positioned in said housing to provide a gradual transition from said large bore to said small bore; a piston slidably mounted within said chamber, having a large section of size corresponding to said large bore and a small section of size corresponding to said small bore, said piston being slidable from a first position where said small section is substantially withdrawn from said small bore to provide a fluid connection between said intake and outlet ports, to a second position where said small section is substantially wholly within said small bore, said piston having an annular groove in its small section; and an O-ring in said annular groove in said piston, said O-ring being capable of making a sealing fit within the wall of said small bore when said piston is in said second position, thereby interrupting the fluid connection between said intake and outlet ports through said chamber.

5. A device of the class described which includes: a housing having a generally cylindrical chamber therein, said chamber having a large bore and a small bore with the axes of said bores being parallel, said housing having an intake port opening into said large bore, and an outlet port opening into said small bore; a tapered shoulder means positioned in said housing to provide a gradual transition from said large bore to said small bore; a piston slidably mounted within said chamber, having a large section of size corresponding to said large bore and a small section of size corresponding to said small bore, said piston being slidable from a first position where said small section is substantially withdrawn from said small bore to provide a fluid connection between said intake and outlet ports, to a second position where said small section is substantially wholly within said small bore, said piston having an annular groove in said small section and an annular groove in said large section positioned to remain on the side of said intake port remote from said outlet port as said piston moves from said first to said second position; and O-rings in each of said annular grooves in said piston, the O-ring on said small section being capable of making a sealing fit with the wall of said small bore when said piston is in said second position, thereby interrupting the fluid connection between said intake and outlet ports through said chamber, and the O-ring on said larger section making a sealing fit with the wall of said large bore when said piston is in either said first or second position to prevent fluid passage from said intake port to the outer end of said large bore.

References Cited in the file of this patent

UNITED STATES PATENTS

| Number | Name | Date |
|---|---|---|
| 1,444,984 | Simmon | Feb. 13, 1923 |
| 1,978,669 | Carroll | Oct. 30, 1934 |
| 1,987,435 | Engel | Jan. 8, 1935 |
| 2,057,707 | Carroll | Oct. 20, 1936 |
| 2,083,654 | Kochmann | June 15, 1937 |
| 2,252,482 | Gates | Aug. 12, 1941 |
| 2,289,318 | Pratt | July 7, 1942 |
| 2,394,343 | Vorech | Feb. 5, 1946 |

FOREIGN PATENTS

| Number | Country | Date |
|---|---|---|
| 548,727 | Great Britain | Oct. 22, 1942 |
| 568,343 | Germany | Jan. 18, 1933 |